United States Patent

Schmidt et al.

[11] Patent Number: 6,167,482
[45] Date of Patent: Dec. 26, 2000

[54] METHOD AND APPARATUS UTILIZING A FLASH MEMORY DEVICE TO MAINTAIN ACCURATE UNIT TIMING

[75] Inventors: Jurgen Schmidt, Hunfelden; Horst Geib, Weiler; Erwin Nikl, Niedernhausen, all of Germany

[73] Assignee: Motorola, Inc., Schaumburg, Ill.

[21] Appl. No.: 08/889,867

[22] Filed: Jul. 8, 1997

[30] Foreign Application Priority Data

Jul. 27, 1996 [GB] United Kingdom ............... 9615828

[51] Int. Cl.⁷ .................. G04F 10/00; G04B 47/00; G06F 12/16
[52] U.S. Cl. ................ 711/103; 365/185.33; 368/1; 368/10; 368/113
[58] Field of Search ............... 702/176, 178, 702/187; 711/103, 165; 395/800.37, 33, 551, 182.13, 555; 365/185.33; 713/400, 500; 968/536, 876; 368/251, 1, 10, 13, 113; 364/528.41; 712/37; 714/15; 700/306

[56] References Cited

U.S. PATENT DOCUMENTS

| 4,303,850 | 12/1981 | Juhasz et al. | 377/32 |
| 4,466,074 | 8/1984 | Jindrick et al. | 702/176 |
| 4,495,596 | 1/1985 | Sciulli | 379/106.01 |
| 4,561,442 | 12/1985 | Vollmann et al. | 607/16 |
| 4,903,327 | 2/1990 | Raghuram et al. | 455/127 |
| 5,155,837 | 10/1992 | Liu et al. | 709/221 |
| 5,164,923 | 11/1992 | Avis | 368/4 |
| 5,216,357 | 6/1993 | Coppola et al. | 324/142 |
| 5,349,697 | 9/1994 | Pelkonen | 455/572 |
| 5,551,077 | 8/1996 | Oda | 455/343 |
| 5,581,510 | 12/1996 | Furusho et al. | 365/185.33 |
| 5,590,092 | 12/1996 | Fehnel | 368/10 |
| 5,740,129 | 4/1998 | Frampton | 368/10 |
| 5,825,648 | 10/1998 | Karnowski | 702/176 |

*Primary Examiner*—Eddie P. Chan
*Assistant Examiner*—Yamir Eucarnacion
*Attorney, Agent, or Firm*—Andrew S. Fuller

[57] ABSTRACT

A method for re-programming a memory device in a microcontroller system is provided. The method includes the steps of installing a software RTC service routine running outside the flash memory device, wherein a counter measures the total re-programming procedure duration (100). The software RTC service routine running outside the flash memory device is stopped (102) and the current absolute unit time saved in a read/write accessible memory cell (104). A re-programming cycle is executed (106) and the former running application will be prepared to continue (108). The unit is set to the previous stored value (110) and the software RTC service routine running outside the flash memory device re-started (112). The software RTC service routine running outside the flash memory device is stopped (114) and the measured total re-programming duration added to the current RTC value (116). The application then recommences (118).

4 Claims, 2 Drawing Sheets

1

METHOD AND APPARATUS UTILIZING A FLASH MEMORY DEVICE TO MAINTAIN ACCURATE UNIT TIMING

FIELD OF THE INVENTION

This invention relates to programmable memory devices. The invention is applicable to, but not limited to, the re-programming of flash memory devices that use software real-time clocks.

BACKGROUND OF THE INVENTION

The improved sophistication in hardware and software, with regard to signal processing in communication units, has increased the ease for reprogramming communication units to provide additional features. Reduced time-to-market goals has forced completion of the designs from conception to production to be faster, therefore leaving less time for new-peripheral support. To accommodate this, code revisions via Erasable Programmable Read Only Memory (EPROM) have been implemented. However, such use of EPROM technology requires either a service call with a technician visit or sending EPROMs to the end user. The use of flash memory devices has offered the same non-volatile storage features as EPROM, but additionally offering a system write capability. Using flash memories in microprocessor controlled systems, code updates are done quickly in the factory, during test and debug, whilst allowing cost-effective field updates to end users via floppy disks or via a modem without disassembling housings or other mechanical elements.

A flash memory is an electrical erasable programmable read/write memory. The feature of the electrical erasability is the advantage of the flash memory comparable with Electrically Erasable Programmable Read Only Memories (EEPROMs) which also provide read/write capability, but are more expensive and where the programming cycles require significantly more processing time. With EPROMs ultra-violet (UV) light is used for the erasing process. This requires physical access to the device. In addition, the programming of the EPROM requires an external dedicated programmer unit. The flash memory however, integrates a write state machine on-chip to internally implement program and erase algorithms. Operations are initiated through command sequence writes to the flash command register and progress is reported back to the controlling instance through the flash status register. A problem associated with the use of such flash devices is that during the programming or erasing time periods the flash device can not access the flash stored data or code.

Often the flash device is connected to a micro-controller which incorporates a number of other circuits and tasks that the micro-controller is required to perform with the assistance of the flash memory device. One such firmware circuit and associated task, that is generally required of flash devices, is to provide a software real-time clock to other circuits. Modern designed micro-controllers use an operating system in order to allow the separation of several software related layers, e.g. user interface layer, control layer, protocol layer, physical layer (H/W drivers). Furthermore, this operating system allows the division of the applications into several tasks. For communication devices it is very important that the response time is predictable. Therefore communication devices must use "real-time operating systems". These operating systems require, for internal functionality (e.g. task scheduling or inter task communication), a real time clock. Typically, due to cost, component count and space limitations the product design will implement the real-time clock in software.

A further use for, and advantage of, flash devices emanates from their ability to provide re-programming opportunities for particular target hardware, e.g. as part of a codeplug function for programming mobile and portable radio units. During re-programming operations only the flash internal programming status register is accessible, and as such, code cannot be executed out of this device at this time. Hence, any software real-time code related functions can not be executed during programming (or erasing) operations and the unit timing loses its accuracy. It is difficult to accurately determine the timing error in such situations due to the unpredictable duration of programming operations with regard to temperature, age and supply voltage of the Flash device.

Previously, two different accessible memory devices have been used as a solution to this problem, e.g. an EPROM for firmware operations and an Electrically Erasable Programmable Read Only Memory (EEPROM) for codeplug operations. This allows the codeplug to be erased without impacting the firmware operation, thereby maintaining the ability to execute programs out of the EPROM. The requirement for cost and size reduction of current products has forced manufacturers to investigate the possibility of only using one device to provide both functions.

In certain situations, where an absolute timing clock is used, the unit's time needs to be manually set after all (re-)programming operations. In addition, in some micro-controllers, the re-programming operation is performed by replacing the firmware code in the EPROM's. This requires the micro-controller to be powered down with subsequent loss of unit timing accuracy.

Micro-controllers running a software Real Time Clock (RTC) and providing a re-programming feature have to deal with the following problem. In modern designed devices the firmware including a software RTC is stored inside a flash device. The flash device technology offers the advantage of a re-programming opportunity in the target hardware. Unfortunately, codeplug information is required in order to execute firmware, therefore both functions are needed to be operational at any time. A further disadvantage being that the current flash technology doesn't allow read operations during a programming cycle. This means that the RTC code cannot be executed during programming activities and therefore the unit loses its accurately adjusted time. The resulting time deviation is unpredictable due to the fact that the programming duration depends on temperature, age and supply voltage of the flash device.

In the past, devices containing the firmware code had to be replaced (EPROM's) due to the fact that they could not be re-programmed in the target hardware. In particular, there exists a need to (re-)program information into radio units dependent upon the communications system being used, customer information or the country of operation, e.g. for approved frequency and transmit power levels. Typically, the micro-controller had to be powered down thereby preventing accurate maintenance of unit time. This resulted in manually maintaining a unit time setting. Absolute unit timing is often required to generate alarm signals indicative of the time that a communication unit failure occurs or for charging different rates for the communications system use.

This results in the necessity to set the unit time manually after every programming session.

This invention seeks to provide a method of programming memory elements, and in particular flash devices, to mitigate at least some of the problems highlighted above.

SUMMARY OF THE INVENTION

According to a first aspect of the present invention, a method for re-programming a flash device in a micro-controller system is provided. The micro-controller includes at least a read/write accessible memory cell. The method comprises the steps of saving a current absolute unit timing parameter in a read/write accessible memory cell, executing a re-programming cycle and measuring a duration for the re-programming cycle. A value for the measured programming duration is then added to the current absolute unit timing parameter in the read/write accessible memory cell to maintain accurate unit timing.

In this manner, unit timing is accurately maintained in a unit where a real-time software clock is used which is disabled when the unit needs to perform certain operations.

In a second aspect of the present invention, a micro-controller having a micro-controller element, a random access memory device and a flash memory device, is provided. The flash memory device contains a plurality of memory blocks and comprises a first memory block of the plurality of memory blocks having a program for measuring a duration of an operational cycle and a second memory block for adding the measured programming duration to the current absolute unit timing parameter in the flash memory device.

A preferred embodiment of the invention will now be described, by way of example only, with reference to the drawings.

DETAILED DESCRIPTION OF THE DRAWINGS

Figure 1:
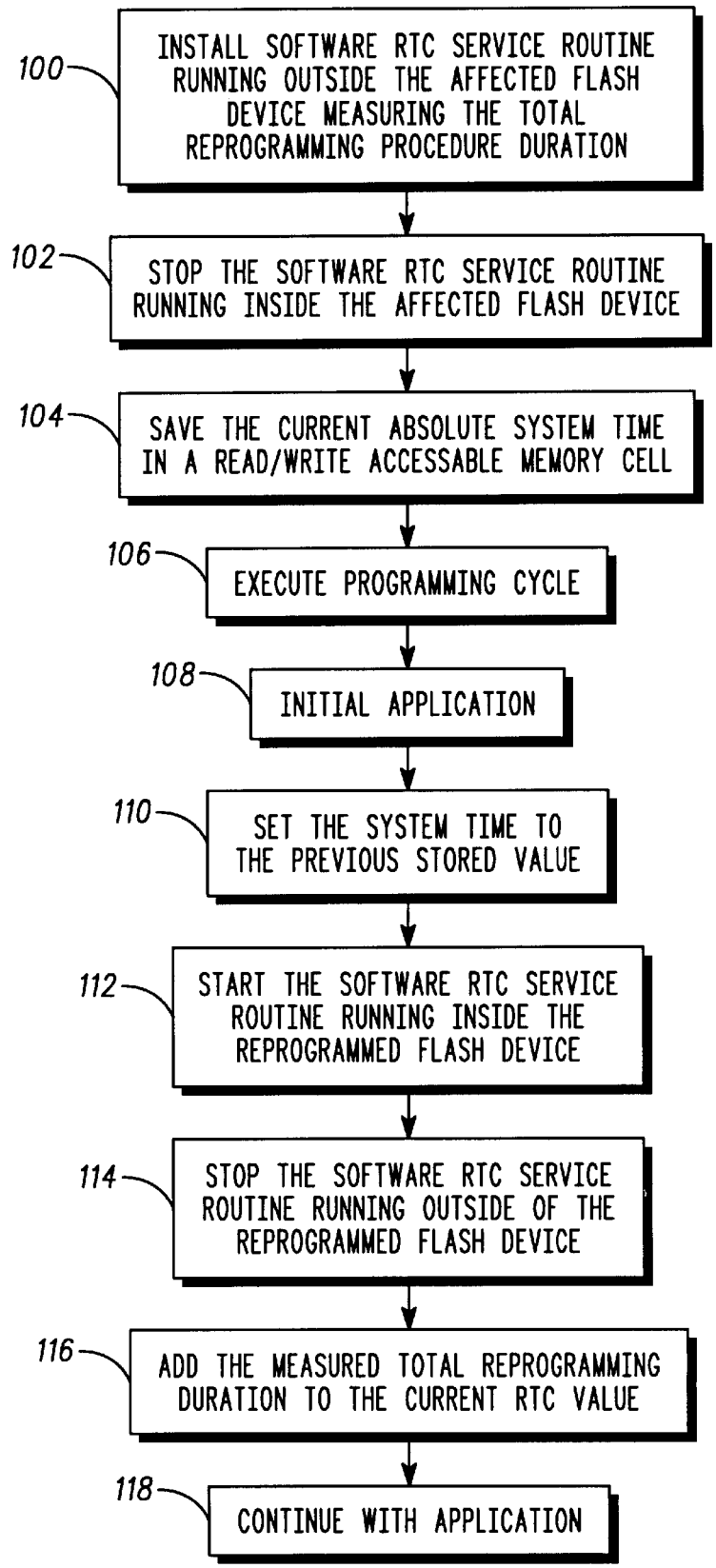
FIG. 1 is a flow chart showing a method for programming Flash devices according to a preferred embodiment of the invention.

Referring first to FIG. 1, a flow chart of a method for programming flash memory devices is shown, according to a preferred embodiment of the invention. The re-programming cycle includes installing a software RTC service routine running outside the affected flash memory device, as shown in step 100, wherein a counter (timer) software routine measures the total re-programming procedure duration. The software RTC service routine, running inside the affected flash memory device is stopped, as any read operation from the flash will return the flash status register content and not the flash storage content, as in step 102. The current absolute unit time is saved in a read/write accessible memory cell, as shown in step 104 and a re-programming cycle executed, as in step 106. The previously running application is initiated, as shown in step 108, and the unit's timing set to the previously stored value, as in step 110. In this context, an application may include firmware code, whereby the application may be required to reload firmware in order to update versions or to load firmware capable of running in an environment other than the current environment or infrastructure. The software RTC service routine running inside the re-programmed flash device is then re-started, as in step 112. Subsequently, when appropriate, the software RTC service routine running outside the re-programmed flash is stopped, as shown in step 114, and the measured total programming duration to the current RTC value, as in step 116. The application then continues as shown in step 118.

In this manner, and beneficially, there is automatic maintenance of the real-time clock. In addition, no user support is required and human error is negated vis-à-vis prior art methods of re-programming. There is improved reliability of absolute unit time information, providing a cost reduction due to the time-optimised re-programming procedure. Hence, a cost effective software RTC is used instead of a hardware RTC.

Figure 2:
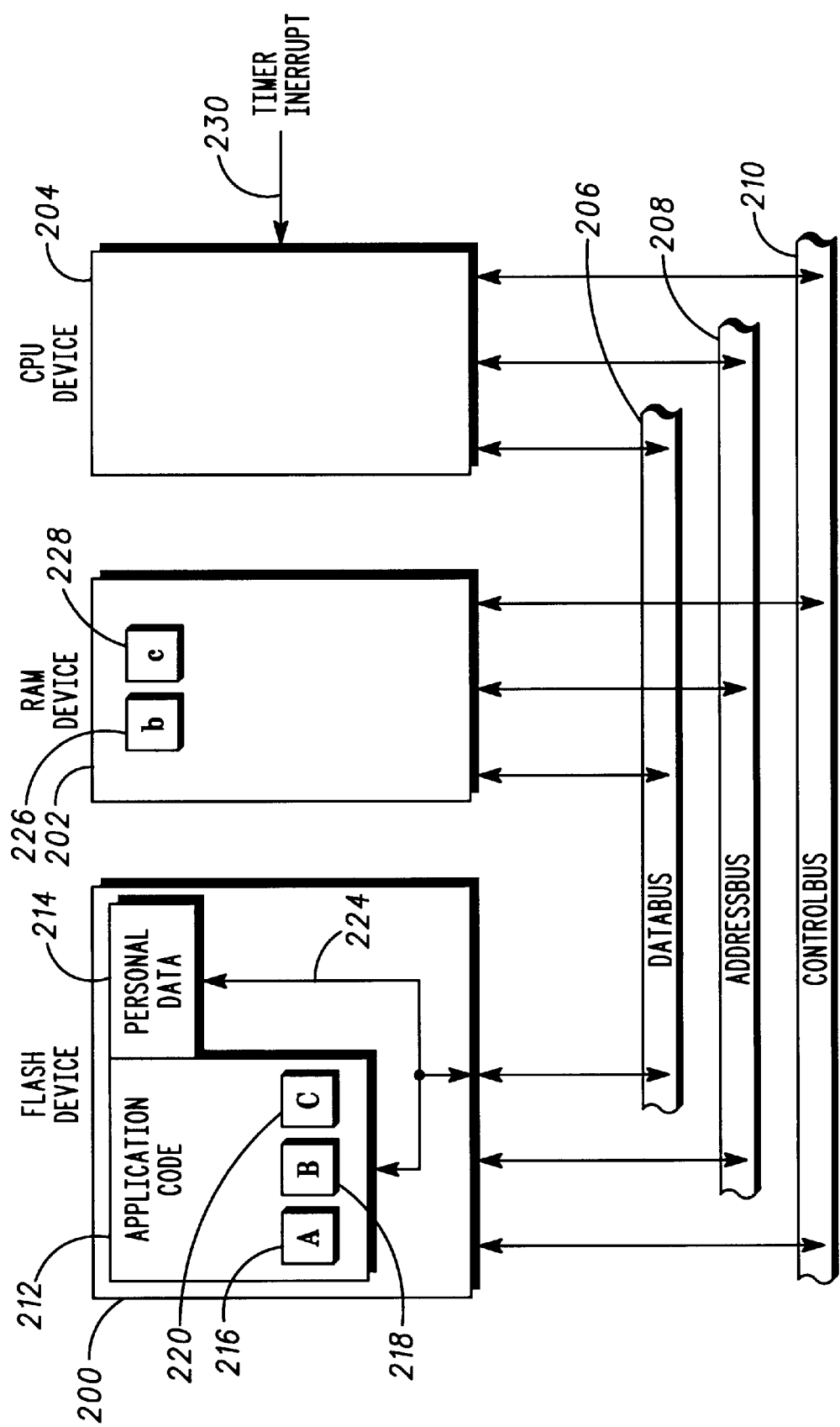
FIG. 2 shows a programming unit according to the preferred embodiment of the invention.

Referring now to FIG. 2, a programming unit is shown, according to the preferred embodiment of the invention. The programming unit includes a flash memory device 200 operably connected to a RAM device 202 and a CPU device 204 via a data bus 206, an address bus 208 and a control bus 210. The CPU device 204 also contains a timer input 230. The RAM device 202 contains a first memory block 226 containing a software routine for re-programming a flash device and a second memory block 228 containing a software routine for measuring the total re-programming duration 'b' and readjusting the RTC. The flash memory device 200 contains a personal data memory block 214 connected to the data bus 206 and an application code memory block 212. The application code memory block 212 contains a third memory block 216 containing a software RTC service routine running inside the flash device, a fourth memory block 218 containing a software routine for re-programming a flash device into the first memory block 226 of the RAM 202. The application code memory block 212 contains a fifth memory block 220 containing a software routine for measuring the total re-programming duration 'b', readjusting the RTC and for copying these functions into the second memory block 228 of the RAM device 202.

In operation, a software RTC service routine operates inside the Flash device. If an operation is performed that requires the RTC service routine is temporarily terminated, the third memory block 216 inside the application code memory block 212, containing the software RTC service routine running inside the flash device, copies the software RTC service routine into the first memory block 226 of the RAM 202. In this manner, the software RTC service routine continues maintenance of an absolute timing value.

Prior to the commencement of the operation which would temporarily terminate the RTC service routine the fifth memory block 220 of the application code memory block 212, containing the software routine for measuring the total re-programming duration 'b' and any readjustment value of the RTC, copies these functions into the second memory block 228 of the RAM device 202. A timer input 230 is used to track the duration of the re-programming operation. The duration of the re-programming operation (or similar operation that terminates the use of the RTC) is then calculated. Once the operation is terminated, the duration measurement is added to the stored value of the RTC and re-programmed back into the flash device 200, thereby maintaining an accurate absolute timing value of the RTC.

In this manner, with the inclusion of the second memory block 220 in the flash device 200 and the fifth memory block 228 in the RAM device 202, the software based RTC is maintained by manipulating its location and its timing value to provide the enhanced features, vis-à-vis the prior art, as previously described.

The primary focus of the invention is for micro-controllers that include a software based RTC equipped with a flash memory device, e.g. radio base stations, cellular telephones, mobile and portable radios. These devices need accurate unit time for say, alarm recording with time stamps, billings related to specific time periods or synchronisation requirements. A specific application would include a communication unit with one flash device and no other non-volatile memory, as described with regard to the preferred embodiment of the control unit of FIG. 1.

It is within the contemplation of the invention that variants of the preferred embodiment may be used to fulfil the same or a similar purpose. These variants may include alternative reasons for (re-)programming such as changing of customer personalised parameters via a codeplug or changing of network (infrastructure) parameters. Customer information may include billing and fee information, help information, non-volatile storage of messages etc. The (re-)programming operation may also include recording of transmitted data or events, dynamic changing of the language for user support, e.g. for displaying help texts, or updating application codes, e.g. for GSM or analogue cellular phones, conventional radios and pagers.

Thus a method for re-programming a flash device and a re-programming unit are provided that mitigate a number of problems associated with the prior art of such technology.

What is claimed is:

1. A method for re-programming a flash memory device in a micro-controller system comprising at least a read/write accessible memory cell, comprising the steps of:

saving a current absolute unit timing parameter, representing real-time clock data, in the read/write accessible memory cell of the flash memory device;

executing a re-programming cycle;

measuring the duration of the re-programming cycle of the flash memory device;

adding the measured duration of the re-programing cycle of the flash memory device to the current absolute unit timing parameter in the read/write accessible memory cell thereby updating the real-time clock data to maintain accurate unit timing;

copying outside the affected flash memory device a software Real Time Clock (RTC) service routine capable of running outside the affected flash memory device, wherein a counter of the software RTC routine capable of running outside the affected flash memory device measures the duration of the re-programming cycle of the flash memory device; and stopping a software RTC service routine running inside the affected flash memory device.

2. A method for re-programming a flash memory device in a micro-controller system comprising at least a read/write accessible memory cell, the method comprising the steps of:

saving a current absolute unit timing parameter, representing real-time clock data, in the read/write accessible memory cell of the flash memory device;

executing a re-programming cycle;

measuring the duration of the re-programming cycle of the flash memory device;

adding the measured duration of the re-programming cycle of the flash memory device to the current absolute unit timing parameter in the read/write accessible memory cell thereby updating the real-time clock data to maintain accurate unit timing;

starting a software Real Time Clock (RTC) service routine running inside the flash memory device; and stopping a software RTC service routine outside of the re-programmed flash memory device.

3. A method for re-programming a flash memory device in a micro-controller system comprising at least a read/write accessible memory cell, wherein an operation of a software real-time clock running inside the flash rmemory device is terminated due to an operation of an application program, the method comprising the steps of:

saving a current absolute unit timing parameter, representing real-time clock data, in the read/write accessible memory cell of the flash memory device;

executing re-programming cycle;

measuring the duration of the re-programming cycle of the flash memory device; and adding the measured duration of the re-programming cycle of the flash memory device to the current absolute unit timing parameter in the read/write accessible memory cell thereby updating the real-time clock data to maintain accurate unit timing;

initiating said application;

setting a unit time to the current absolute unit depend parameter; and continuing with the said application program.

4. The method for re-programming a flash memory device according to claim 3, wherein said application program includes any one of the following: billing and fee information, help information, non-volatile storage of messages, recording transmitted data or events, changing the language for user support, displaying help texts, updating application codes.

* * * * *